United States Patent [19]

Metzenthen et al.

[11] 3,764,991

[45] Oct. 9, 1973

[54] DEVICE COMPRISING A PLURALITY OF SERIES ARRANGED STORAGE ELEMENTS

[75] Inventors: William Edward Metzenthen, Maidstone, Victoria, Australia; Nicolaas Alphonsus Maria Verhoeckx, Emmasingel, Eindhoven, Netherlands

[73] Assignee: U.S. Philips Corporation, New York, N.Y.

[22] Filed: July 8, 1971

[21] Appl. No.: 160,740

[30] Foreign Application Priority Data

July 17, 1970 Netherlands ..................... 7010586

[52] U.S. Cl. ........................................ 340/172.5

[51] Int. Cl. ........................................ G11c 19/00

[58] Field of Search ............................ 340/172.5

[56] References Cited

UNITED STATES PATENTS

| | | | |
|---|---|---|---|
| 3,571,808 | 2/1971 | Washizuka et al. | 340/172.5 |
| 3,388,383 | 6/1968 | Shivdasani et al. | 340/172.5 |
| 3,540,004 | 11/1970 | Hansen | 340/172.5 |
| 3,602,901 | 8/1971 | Jen | 340/172.5 |
| 3,609,702 | 9/1971 | Gardner et al. | 340/172.5 |
| 3,623,020 | 11/1971 | Mao | 340/172.5 |
| 3,646,516 | 2/1972 | Flinders et al. | 340/146.1 BE |

*Primary Examiner*—Paul J. Henon
*Assistant Examiner*—Paul R. Woods
*Attorney*—Frank R. Trifari

[57] ABSTRACT

A device for evaluating pulse groups with reference to a test criterion, comprising a sorting register consisting of a plurality of cascade arranged storage elements for sorting the 0 and 1 pulses written in in this register, a write circuit for writing in the pulse groups in the sorting register and a decision device which in conformity with the test criterion is connected to the information output of at least one of the storage elements of the sorting register and which indicates by way of supplying a 1 or 0 pulse whether the pulse group written in in the sorting register satisfies or does not satisfy the imposed test criterion. The device may be used, for example, as a matched filter, a control device for *m*-out-of-*n* codes or as majority decision decoder.

12 Claims, 6 Drawing Figures

INVENTORS
WILLIAM EDWARD METZENTHEN
NICOLAAS A.M. VERHOECKX

BY
Frank R. Trifari
AGENT

INVENTORS
WILLIAM EDWARD METZENTHEN
NICOLAAS A.M. VERHOECKX
BY
AGENT

INVENTORS
WILLIAM EDWARD METZENTHEN
NICOLAAS A.M. VERHOECKX
BY
AGENT

INVENTORS
WILLIAM EDWARD METZENTHEN
NICOLAAS A.M VERHOECKX
BY
[signature]
AGENT

INVENTORS
WILLIAM EDWARD METZENTHEN
NICOLAAS A.M. VERHOECKX

BY

AGENT

DEVICE COMPRISING A PLURALITY OF SERIES ARRANGED STORAGE ELEMENTS

The invention relates to a device comprising a plurality of series arranged storage elements, including a write circuit connected to an information pulse source for storing a number of information pulses forming a pulse group in said storage elements, and an output circuit, means connecting an information output of a storage element to an information input of the subsequent storage element, control pulses originating from a control pulse circuit being applied to said storage elements for controlling each storage element so as to shift the binary value 0 or 1 stored therein to an adjacent storage element. As is known the binary values 0 and 1 serve to distinguish the two states which may be assumed by the storage elements.

Such devices provided with a plurality of series arranged of storage elements are frequently used in practice, for example, as shift registers, in which the pulses originating from the information pulse source are applied to the information inputs of the first storage elements and after shifting in the rhythm of the control pulses are derived from an information output of the last storage element. Such a shift register may be used, for example, as a digitial delay line.

It is an object of the present invention to provide a device of the kind described in the preamble, having a different conception and having a structure suitable for integration in a semiconductor body, and which may be used advantageously for different novel purposes, for example, as a matched filter; as a control device for an *m*-out-of-*n* code, for example, a two-out-of-five code; as a majority decision decoder and the like.

The device according to the invention is characterized in that for the purpose of evaluating stored pulse groups with reference to a test criterion said plurality of series arranged storage elements comprises means connecting an output of each pair of two successive storage elements to an information input of said pair, whereby the said plurality of series arranged storage elements operates as a sorting register in which the binary pulses stored in each pair of two successive storage elements is exchanged during the shifting operation provided the pulse stored in the first storage element of a pair is representing the binary value 1 and the pulse stored in the second storage element of the same pair is representing the binary value 0, while furthermore the device comprises means connecting said output circuit including decision means in accordance with the test cirterion to an information output of at least one of said storage elements, and means for timing the cycle of successive storing-sorting-and decision-making operations whereby at the end of the decision making operation the output circuit by producing either a 1 or a 0 pulse indicates whether or not the originally stored pulse group satisfies said test cirterion.

In order that the invention may be readily carried into effect, some embodiments thereof will now be described in detail, by way of example, with reference to the accompanying diagrammatic drawings in which:

FIG. 1 shows a device according to the invention, while

Figure 1:
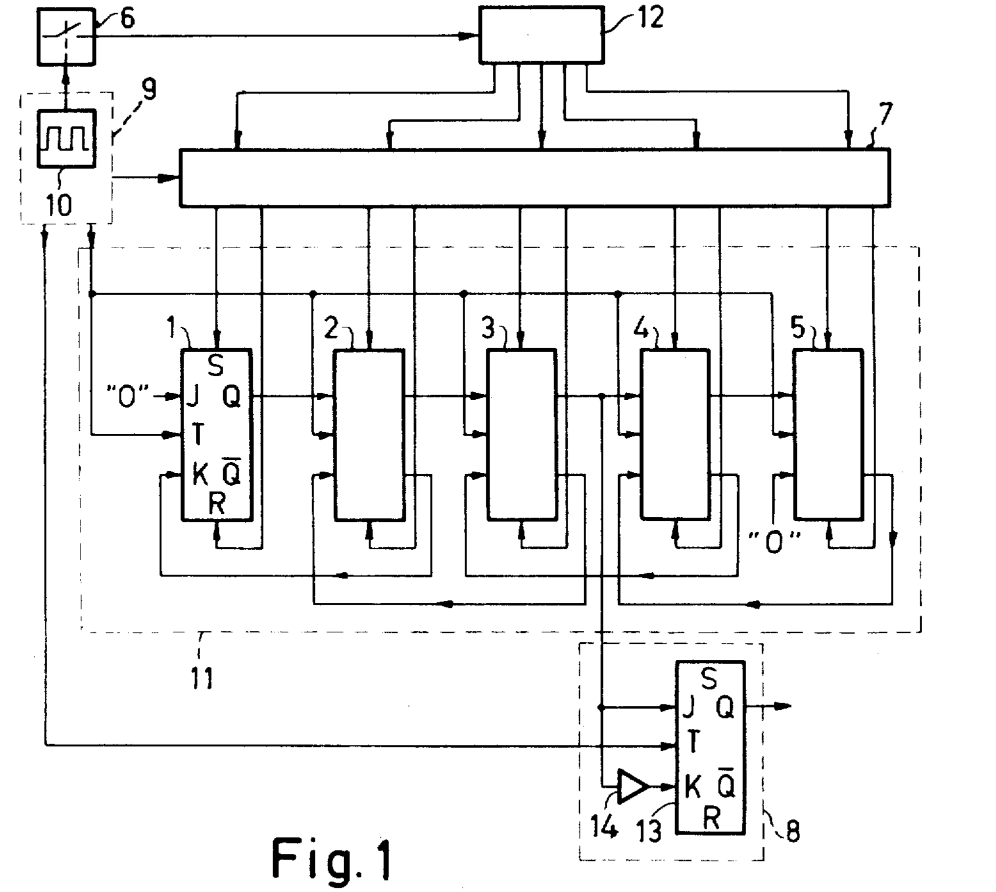

FIG. 1 shows a device according to the invention comprising a plurality of series arranged storage elements of, for example, five storage elements 1–5 including a write circuit 7 connected to an information pulse source 6, and an output circuit 8. The information pulse source 6, the write circuit 7 and the output circuit 8 are controlled by a control pulse circuit 9 including a pulse generator 10. In the embodiments to be described hereinafter, the structure of this control pulse circuit 9 will be dealt with further.

The storage elements 1–5 in this embodiment are constituted as master and slave storage elements of the JK-type having information inputs J and K, a control pulse input T for control pulses likewise originating from the control pulse circuit 9 and information outputs Q and $\bar{Q}$ which are inverse relative to each other, while the state of each storage element determining the binary value of the pulse stored therein is characterized by the binary value 0 or 1 of the information output Q. In this embodiment the information output Q of each storage element 1–4 is connected to the information input J of the subsequent storage element and the pulses stored in said storage elements 1–4 are shifted under the control of control pulses from the control pulse circuit 9 to the next storage elements 2–5. The frequency of the control pulses, for example, is equal to the clock frequency of the pulse generator 10.

After the occurrence of a control pulse the state of the aforementioned master and slave storage element is determined by the binary values of the inputs J and K, and the output Q before the occurrence of the control pulse. Before the occurence of a control pulse the binary values of the inputs J and K and of the output Q may be mathematically represented by $J_t$, $K_t$, $Q_t$, respectively, while the binary value of the output Q after the occurence of a control pulse may be mathematically represented by $Q_{t+d}$. The relationship between $Q_{t+d}$, $J_t$, $K_t$, $Q_t$ of a master and slave storage element of the JK-type may then be represented by the Boolean expression:

$$Q_{t+d} = Q_t\bar{K}_t + \bar{Q}_tJ_t \quad (1)$$

In addition to the above-mentioned information inputs J and K, these types of master and slave storage elements are also provided with a set input S and a reset input R. Independent of what has been mentioned above the storage element is in the 1 binary value state when a pulse of 1 binary value occurred at the set input S, and is in the 0 binary value state when a pulse of 1 binary value occurred at the reset input R.

A shift register may be formed in known manner with the aid of the series arranged storage elements shown. To this end, the output $\bar{Q}$ of each storage element 1–4 is also connected to the input K of its subsequent storage element 2–5 respectively, while the information pulse source 6 is connected to the input of the series arrangement. The output pulses from the information pulse source 6 are then derived from the output Q of the storage element 5 after a delay period which is equal to five control pulse periods.

The device according to the invention is essentially distinct in conception from this known device in that for the purpose of evaluating pulse groups with reference to a test criterion the successive pulses of 0 and 1 binary values in these pulses groups which are constituted by a fixed number of pulses successively provided by the information pulse source 6 are stored through the write circuit 7 in the successive storage elements 1–5 of the series arrangement, forming a sorting register 11 for sorting the stored pulses. To this end an output of each second storage element of each group of two successive storage elements 1, 2; 2,3; 3,4; 4,5 is connected to an input of the preceding first storage element of said group which effects a shift only when the first storage element is in the 1 binary value state and the second storage element is in the 0 state by means of exchanging the pulse stored in the first storage element for the pulse stored in the second storage element, while furthermore the output circuit 8 is formed as a decision device which in conformity with the test criterion is connected to an information output of at least one of the storage elements 1–5. Under the control of control pulses the write circuit 7, the sorting register 11 and the decision device 8 are successively actived.

After sorting the pulses of 1 and 0 binary values stored in the sorting register, the decision device 8 indicates by means of producing a 1 of 0 binary value whether the number of 0 or 1 pulses in the sorting register satisfies or does not satisfy the imposed test criterion.

In the embodiment shown the pulses originating from the information pulse source 6 are applied to a series-to-parallel converter 12 which every time applies pulse groups comprising five pulses to the wirte circuit 7 which under the control of write pulses orginating from the control pulse circuit 9 writes the successive pulses in the pulse group in the successive storage elements 1–5 of the sorting register 11. To this end the set and reset inputs S, R of each storage element are connected to an output line of the write circuit 7 provided with five pairs of output lines. To obtain a sorting function of the sorting register 11, the output $\bar{Q}$ of each storage element 2–5 is connected through a return line to the input K of its directly preceding storage element while a 0 pulse is continuously applied to the inputs J and K of the storage elements 1 and 5, respectively. The decision device 8 is formed, for example, likewise as a master and slave storage element 13 of the JK-type whose control pulse input T is likewise connected to the control pulse circuit 9, while the inputs J and K are connected directly and through an inverter 14, respectively, to the output Q of the storage element 3.

Figure 2:
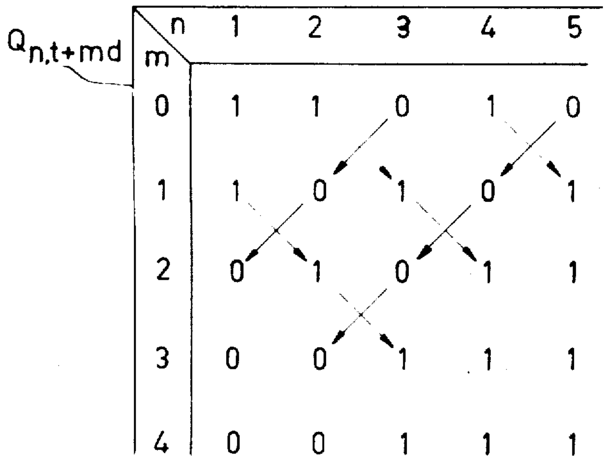
FIG. 2 shows a table of states to explain the device of FIG. 1.

After writing in, for example, the pulse group 11010 in the sorting register 11, in which case the states of the storage elements 1–5 are 11010 respectively, the 0 and 1 pulses of this pulse group will be shifted in the direction of the storage elements 1 and 5, respectively, under the control of the control pulses functioning as sorting pulses and originating from the control pulse circuit 9, as will be further illustrated by way of the table of states in FIG. 2. The fact that this separation between the pulses of 0 and 1 binary values is obtained in the series arrangement is a result of the property of the series arrangement described in which shifting of a pulse from a storage element to its subsequent storage element is effected if this element is in the 0 state which 0 pulse is in turn shifted back to the preceding storage element. To explain this exchange property of the series arrangement in greater detail, the expression (1) is used as a starting point. If $J_n$, $K_n$ represent the inputs and $Q_n$ represents the output of the nth-storage element in the series arrangement then according to (1) the expression:

$$Q_{n,t+d} = Q_{n,t}\,\bar{K}_{n,t} + J_{n,t}\,\bar{Q}_{n,t} \qquad (2)$$

is derived. Since in the series arrangement shown the input $J_n$ is connected to the output $Q_{n-1}$ of the preceding storage element and the input $K_n$ is connected to the output $\bar{Q}_{n+1}$ of the subsequent storage element, it follows that:

$$J_{n,t} = Q_{n-1,t} \qquad (3)$$

$$K_{n,t} = \bar{Q}_{n+1,t} \qquad (4)$$

The binary value at the output $Q_n$ after the occurence of a sorting pulse may therefore be expressed by the binary values of the output lines $Q_n$, $Q_{n-1}$, $Q_{n+1}$ before the occurence of a sorting pulse; so that:

$$Q_{n,t+d} = Q_{n,t}\,Q_{n+1,t} + \bar{Q}_{n,t}\,Q_{n-1,t} \qquad (5)$$

It follows that in the case $Q_{n,t} = 1$ and consequently $\bar{Q}_{n,t} = 0$ the value of $Q_{n,t+d}$ is exclusively determined by the value of $Q_{n+1,t}$. In other words, the value 1 of $Q_n$ will after the occurrence of a sorting pulse only change to the value 0 if $Q_{n+1}$ has the value 0; this means that the 0 pulse of a storage element is shifted back to its preceding storage element and this will take place only when a 1 pulse is stored in this preceding storage element. Analogously, the value 0 of $Q_n$ only changes to the value 1 after the occurrence of a sorting pulse if $Q_{n-1}$ has the value 1; this means that a 1 pulse stored in a storage element is shifted to the subsequent storage element and this will take place only when a 0 pulse is stored in this subsequent storage element. This shows that an exchange of the pulses between storage elements is effected if the above-mentioned conditions are satisfied.

The continuously present 0 pulses at the inputs J and K of the storage elements 1 and 5, respectively, constitute blocking voltages which prevents the pulses of the pulse group stored in the sorting register from being shifted out of the series arrangement.

In FIG. 2 a table of states illustrates the sorting process in the sorting register with the aid of a give pulse group stored in the sorting register, for example, of the form 11010. In this table of states the symbols 1 and 0 indicate the binary values of the output lines $Q_n$ for $n = 1, 2, \ldots, 5$ at the instants $t+md$ for $m = 0, 1, \ldots, 4$. In this case n relates to the reference numerals of the successive storage elements of the sorting register and the reference d denotes the period of the sorting pulses and m denotes the number of sorting pulses.

When the above-mentioned pulse group 11010 is written in in the sorting register at the instant $t$, the state of the sorting register is given by the first row $m = 0$ in the table of states. Particularly in this state the binary values at the Q-outputs of the successive storage elements 1–5 are exactly equal to the succesisve binary values of the pulses in the pulse group 11010.

When a first sorting pulse occurs, the state of the sorting register as represented for $m = 0$ changes to the state as represented for $m = 1$ whereby an exchange of pulses between two successive storage elements $n$ and $n+1$ takes place only when the storage elements $n$ is in the 1 state and the subsequent storage element $n+1$ is in the 0 state. Thus, in the given embodiment the pulses stored in the storage elements 2 and 3 will be exchanged as well as the pulses stored in the storage elements 4 and 5, whereby in the manner as already described hereinbefore the 1 pulses stored in the storage elements 2,4 are shifted to the storage elements 3,5 respectively, and the 0 pulses stored in the storage elements 3,5 are shifted to the storage elements 2,4 respectively. In the table of states the shift of the 1 pulses is illustrated by the broken-line arrows and that of the 0 pulses is illustrated by the solid-line arrows.

In the same manner the states as shown at $m = 1$ will change to the states shown in the third row at $m = 2$ of the stable of states when the second sorting pulse occurs. Likewise as hereinbefore the shifts of the 1 pulses are illustrated by the broken-line arrows and those of the 0 pulses are shown by the solid-line arrows.

The sorting process described continues for the subsequent sorting pulses in the manner described until none of two successive storage elements $n$ and $n+1$ are in the 1 and 0 state respectively. In this state the sorting process is ended. Particularly, in this state all 1 pulses are shifted in the direction of one end of the sorting register and all 0 pulses are shifted in the direction of the other end of the sorting register. In the embodiment shown it is found, for example, that the final state is reached after three sorting pulses which final state is shown at $m = 3$. In this final state two 0 pulses of the pulse group 11010 define the states of the successive storage elements 1,2 and the three 1 pulses define the states of the three successive storage elements 3,4,5.

After the final state of the sorting process is reached, the subsequent sorting pulses do not bring about any change in the states of the storage elements and, for example, the states occurring after four sorting pulses as shown at $m = 4$ is found to be exactly equal to the previous state as shown at $m = 3$.

Without influencing the sorting process a sufficiently large number of sorting pulses may therefore be used, which is particularly advantageous to ensure that for each arbitrarily stored pulse group the final state of the sorting process is also reached. For example, in the embodiment shown this final state occurs after three sorting pulses. Particularly the number of sorting pulses prior to reaching the final state is always found to be smaller than the number of pulses in the pulse groups to be sorted so that also in case of very long pulse groups the sorting process is realized very rapidly; for example, if the pulse group has 100 pulses, a maximum number of 99 sorting pulses is necessary.

Once the final state of the sorting process is reached, the decision device 8 of the sorting register 11 connected to the information output Q of the third storage element is activated by a decision pulse from the control pulse circuit 9, and indicates the state of the storage element 3 to be either 1 or 0. When, as shown in the embodiment the storage element is in the 1 state the subsequent storage elements 4,5 will be in the 1 state as well so that the evaluated pulse group includes at least three 1 pulses. When on the other hand after the sorting process, the decision device 8 indicates that the storage element 3 is in the 0 state, then this fact provides an indication that the evaluated pulse group comprises at least three 0 pulses. The decision device 8 produces a 1 output pulse in response to the 1 state of the storage element connected thereto, to establish the minimum number of 1 pulses in the evaluated pulse group, while the minimum number of 0 pulses in the evaluated pulse group is established by a 0 output pulse of the decision device 8, which output pulse is responsive to the 0 state of said storage element.

In this manner pulse groups are rapidly evaluated with reference to a test criterion and by way of a purely digital process with the convenient equipment described. The pulse groups stored in the sorting register is tested on the base of the test criterion prescribing that the pulse groups must be composed of either a minimum or a maximum number of 0 or 1 pulses. This equipment is not only completely built up from digital elements, and is not only particularly suitable for integration in a semiconductor body, but it can also advantageously be used for different purposes, for example, as a matched filer; as a control filter; for pulse groups which are coded, for example, in accordance with a two-out-of-five code, and the like.

Figure 3:
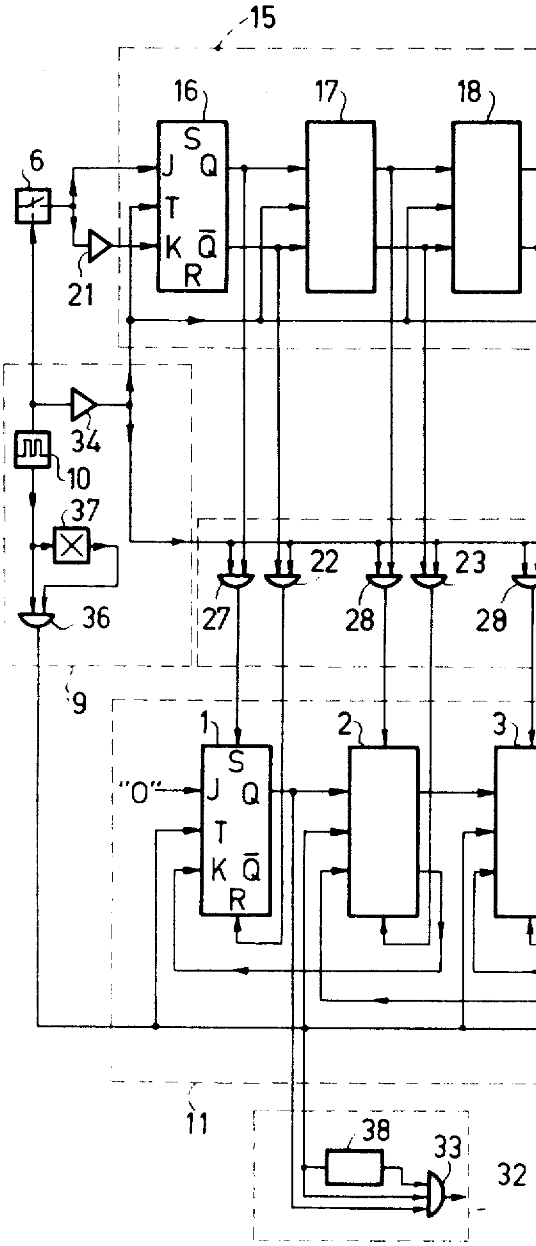
FIG. 3 shows an embodiment of the device according to the invention, constituted to form a matched filter.

FIG. 3 shows an embodiment of the device according to the invention described with reference to FIG. 1 in greater detail. This embodiment is used as a matched filter. Elements corresponding to those in FIG. 1 are indicated with the same reference numerals.

The information pulses originating from the information pulse source 6 are applied to a series-to-parallel converter whose outputs are connected through the write circuit 7 to the storage elements 1–5 of the sorting register 11 which is equal to the sorting register of FIG. 1.

In this embodiment the series-to-parallel converter is constituted by shift register 15 provided with the series arrangement of five storage elements 16–20 of the kind used in the sorting register. These storage elements 16–20 will be referred to as "shift register elements." The pulses from the information pulse source 6 are directly applied to the J-input and through an inverter 21 to the K-input of the shift register element 16 and the shift pulses for the shift register 15 are applied to the T-inputs of all shift register elements 16–20. Each of the outputs Q and $\bar{Q}$ of the shift register elements 16–20 are connected to an S or R-input of the storage elements of the sorting register 11 through the write circuit 7 constituted by selection gates in the form of AND-gates 22–31, while a decision device 32 likewise constituted by a selection gate in the form of an AND-gate 33 is connected to the Q-output of the storage element 1.

The control pulses for the device are derived from the control pulse circuit 9, whereby the clock pulses for the information pulse source 6 are derived from the pulse generator 10, the shift pulses for the shift register 15 and the write pulses for the write circuit 7 are derived from an inverter 34 connected to the pulse generator 10, and the sorting pulse for the sorting register 11 as well as the decision pulses for the decision device 32 are derived from an AND-gate 36.

In the embodiment shown, the control pulse circuit 9 is formed in such a manner that the sorting process of the sorting register 11 and the decision made by the decision device 32 is effected within half a shift period of the shift pulses for testing overlapping pulse groups occurring in the rhythm of the clock frequency of the pulse generator 10. For this purpose, the sorting pulses derived from the AND-gate 36 for the sorting register 11 and the decision pulses for the decision device 32 are generated by means of a frequency multiplier 37 having a multiplication factor of, for example, 16, and whose output pulses together with the output pulses from the pulse generator 10 are applied to the AND-gate 36. In addition to the output pulses from the frequency multiplier 37. The decision device 32 constituted by the AND-gate 33 is controlled by the output pulses from the frequency multiplier together with the output pulses from a counter 38 which every time after, for example, eight counted sorting pulses applies a pulse to the AND-gate 33, which pulse coinciding with a sorting pulse for the sorting register produces a 0 or 1 output pulse at the output of the AND-gate 33 in conformity with the state of the storage element 1 of the sorting register 11.

Since the AND-gate 36 is controlled by the output pulses of the pulse generator 10 and the write circuit by the inverted outpulses of this pulse generator, the write circuit 7 and the sorting register 11 together with the decision device 32 are alternately activated each clock period of the pulse generator 10, whereby the decision device 32 is activated at the end of each sorting process by an output pulse of the counter 38. This establishes the evaluation of a pulse group stored in the shift register 15 during one clock period of the pulse generator 10. To that end the pulse group stored in the shift register is written in in the sorting register by activating the write circuit 7 during the first half period of a clock period corresponding to eight output pulses of the frequency multiplier 37. In the subsequent half clock period the sorting process is effected by the sorting pulses derived from the And-gate 36, and at the end of this sorting process the decision device 32 is activated. The result of the evaluation process is again characterized by the binary value 1 or 0 at the output of the decision device, whereby a 1 indicates that the pulse group stored in the shift register satisfies the imposed test criterion and whereby a 0 indicates that said pulse group does not satisfy said test criterion.

To use the above-mentioned device as a matched filter the connections between the shift register 15 and the sorting register 11 are adapted to a characteristic pulse group. When for example such a characteristic pulse group is given by the pulse group 11010, whose pulses 0,1,0,1,1 successively occur at the output of the information pulse source, the connections between the outputs of the shift register elements 16–20 and the R, S-inputs of the storage elements 1–5 are provided in such a manner that, if said pulse group 11010 is stored in the shift register, a 1 pulse is written in in all storage elements 1–5 of the sorting register 11. Thus, a 1 output pulse will be produced by the AND-gate 33 after the sorting process when the characteristic pulse group is stored in the shift register. On the other hand when the pulse group in the shift register is not equal to the mentioned characteristic pulse group, at least one 0 will be written in in the sorting register so that after the sorting process the pulse stored in the first storage element 1 will be 0 and consequently a 0 will occur at the output of the AND-gate 33. The occurrence or absence of the pulse group characteristic of the matched filter is thus characterized by the occurence of a 1 or 0 output pulse of the AND-gate 33 respectively.

A considerable advantage of the matched filter described is its simple adjustability. Particularly when in addition to the characteristic pulse group also those pulse groups are to be distinguished which differ, for example, only by one pulse from the characteristic pulse group, this object can be realized in a simple manner by connecting the decision device 32 to the output of the storage element 2 of the sorting register 11.

As compared with the known matched filters in which a threshold device is used for determining an analogous peak voltage the device described realizes a much more sensitive distinction by producing a 1 or 0 output pulse, while furthermore influencing of the final result by supply voltage variations, drift phenomena, etc., is completely obviated. The device described not only realizes a very sensitive matched filter, but also realizes a matched filter suitable for integration in a semiconductor body.

Figure 4:
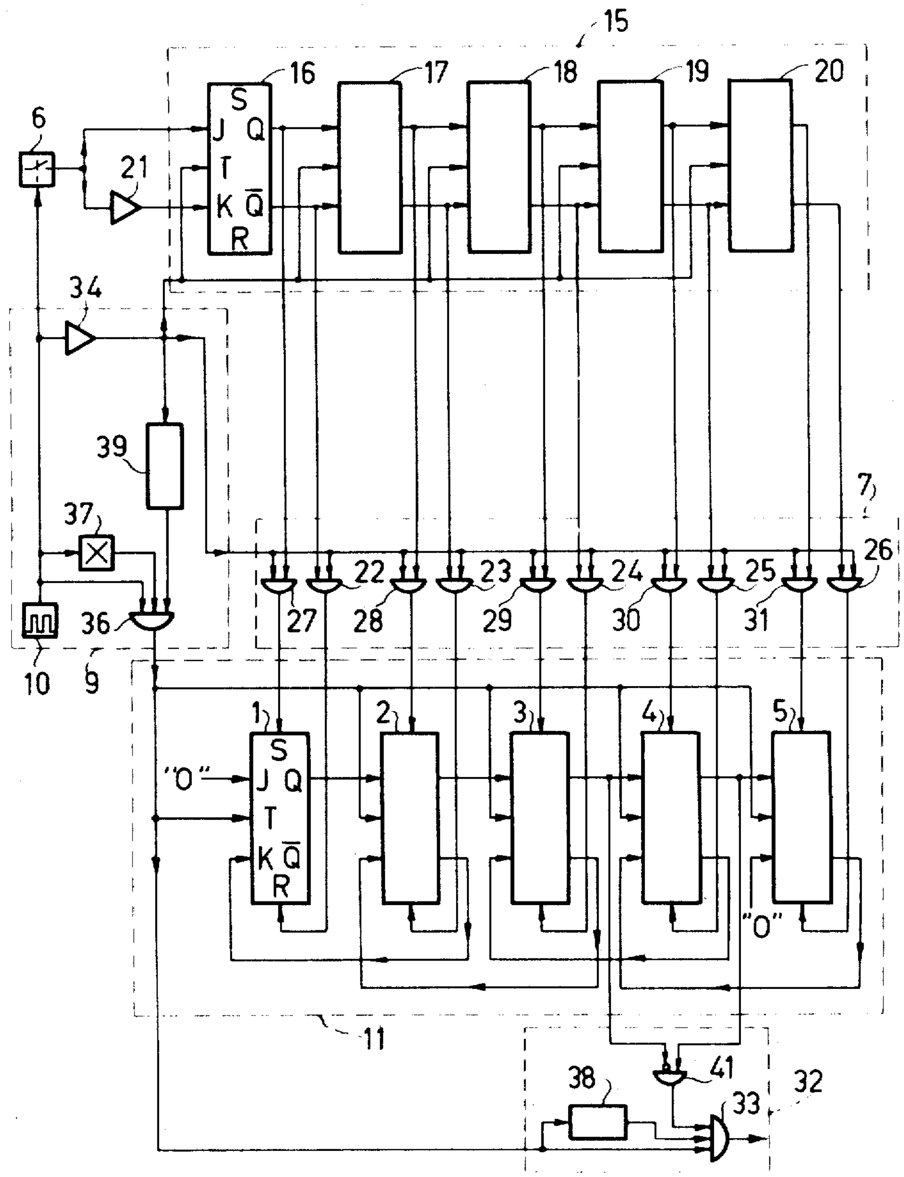
FIG. 4 shows an embodiment of the device according to the invention, constituted to form a control device for two-out-of-five codes.

FIG. 4 shows a modification of the device of FIG. 3, suitable for use as a control device for an *m*-out-of-*n* code, which code is characterized in that each pulse group constituted by n pulses comprises *m* 1 or 0 pulses, which *m* pulses are arbitrarily distributed over the n pulses of the pulse group. In this case, the control device checkes the number of, for example, 1 pulses in each pulse group constituted by n pulses. In particular the device of FIG. 4 is adapted to check two-out-of-five code, which code groups are constituted of five pulses comprising two 1 pulses.

The device shown in FIG. 4 differs from the device shown in FIG. 3 in that the outputs Q of the shift register elements 16–29 are only connected to the inputs S of the storage elements of the sorting register, and the outputs $\bar{Q}$ of the shift register elements are only connected to the inputs R of the storage elements of the sorting register. As in FIG. 3 these connections are established through the write circuit 7. Whereas in FIG. 3 overlapping pulse groups occurring in the rhythm of the clock frequency are tested, the device shown in FIG. 4, is adapted to examine pulse groups consecutively occurring after five clock periods. For examining these pulse groups the control pulse circuit 9 is provided with a counter 39 the input of which is connected to the output of the inverter 34, and the output of which is connected to an input of the AND-gate 36.

Whenever five shift pulses have been counted by the counter 39, it applies a pulse to the AND-gate 36 to start the sorting of the pulses stored in the sorting register 11. The result of the sorting process is again characterized by a 1 or a 0 pulse at the output of the AND-gate 33. When the pulse group constituted by five pulses comprises two 1 pulses, then after the sorting process 1 pulses will be stored in the storage elements 4,5 of the sorting register and 0 pulses will be stored in the other storage elements 1–3. The occurrence of this state in the sorting register may be found in a simple manner by using a selection gate 41 constituted as an AND-gate the output of which is connected to an input of the AND-gate 33, an input of which is connected to the output Q of the storage elements 4 and an inhibitor input of which is connected to the output Q of the storage elements of the sorting register 11. In this case a 1 pulse will occur at the output of this AND-gate 41.

When the pulse group in the shift register 15 differs from the two-out-of-five code group, that is to say, when it does not comprise two 1 pulses, the pulses stored in the storage elements 3 and 4 of the sorting register after the sorting process will not be simultaneously a 0 and a 1 pulse so that a 0 pulse will occur at the output of the AND-gate 41. In this manner a uniform and convenient control of *m*-out-of-*n* codes is obtained by using the device according to the invention.

This device, too, is distinguished in a particular manner from the known control devices for *m*-out-of-*n* codes, particularly by its convenient and simple structure, while with the known devices the complexity of structure is progressively increased with the length of the pulse groups to be examined.

Figure 5:
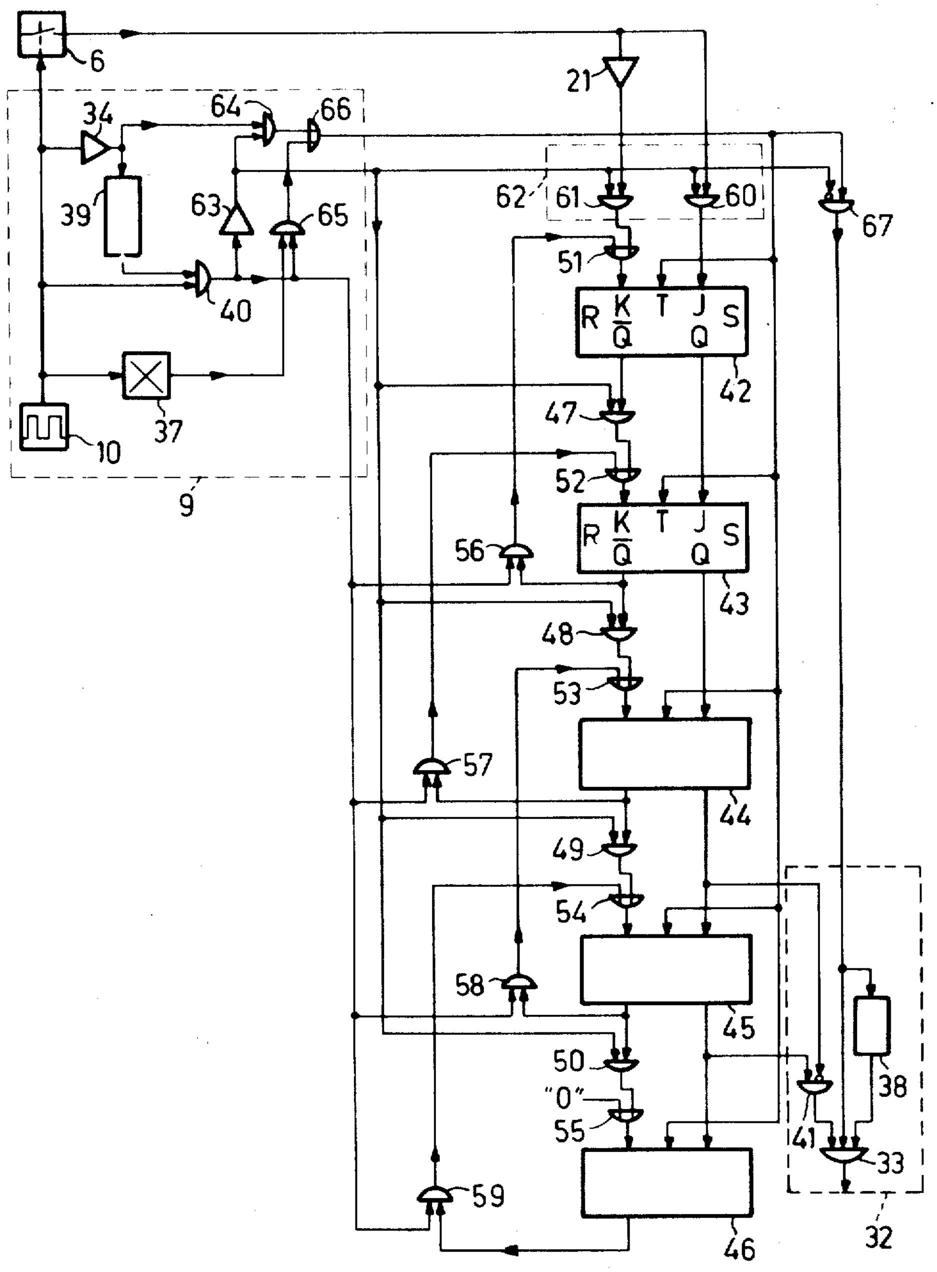
FIG. 5 shows a modification of the device of FIG. 4.

FIG. 5 shows a modification of the control device of FIG. 4 in which the shift register function and the sorting function are fulfilled by the same series arrangement of storage elements 42–46.

The device shown comprises a number of switching circuits in the form of selection gates controlled by control pulses originating from the control pulse circuit 9 to enable a visa versa switching of the cascade arrangement from a shift register to a sorting register during successive periods of time defined by five successive clock pulses.

To realize both the shift register function, and the sorting function, the inputs K of the storage elements are connected to the outputs of the OR-gates 51–55, whereby an input of the OR-gates 52–56 is connected to the output $\bar{Q}$ of the storage elements 42–45, respectively, through AND-gates 47–50 to realize the shift register function and its on-off-switching, while an input of the OR-gates 51–54 is connected to the output Q of the storage elements 43–46, respectively, through AND-gates 56–59 to realize the sorting function and its on-off-switching.

In this embodiment the information pulse source 6 is connected through an AND-gate 60 to the input J of the storage element 42, which AND-gate 60 together with an AND-gate 61 connected to the output of the inverter 21 constitutes the write circuit 62.

For alternately activating the cascade arrangement as a shift register and as a sorting register, the output of the counter 39 together with the output of the pulse generator 10 is applied in the control pulse circuit 9 to an AND-gate 40 whose output is connected directly at one end to an input of the AND-gates 56–59 and at the other end through an inverter 63 to the input of the AND-gates 47,50,60,61. The shift pulses for the shift register function are derived from an AND-gate 64 controlled by the output pulses from the inverters 34,63 while the sorting pulses for the sorting function are derived from an AND-gate 65 controlled by the output pulses from the AND-gate 40 and the frequency multiplier 37, the pulses derived from the AND-gates 64,65 are applied to the control pulse inputs T of the storage elements 42–46 through an OR-gate 66. The pulses for the decision device 32 are derived from an AND-gate 67 an input of which is connected to the output of the OR-gate 66 and an inhibitor input of which is connected to the output of the inverter 63, while the output pulses from this AND-gate 67, likewise as in the embodiment of FIG. 4, are applied directly and through the counter 38 to the AND-gate 33.

If the counter 39 has not yet counted five pulses, a "0" pulse occurs at the output of the AND-gate 40 so that the AND-gates 56–59 are blocked and the AND-gates 47–50 as well as the AND-gates 60,61 of the write circuit 62 are activated. In this state the cascade arrangement of storage elements function as a shift register while the information pulses supplied by the information pulse source 6 are written in in the storage elements under the control of the shift pulses derived from the AND-gate 64.

After five shift pulses counted by the counter a 1 pulse is available at the output of the AND-gate 40 so that the AND-gates 56–59 are activated and the AND-gates 47–50 as well as the two AND-gates 60,61 of the write circuit 62 are blocked. In this state the series arrangement of storage elements functions as a sorting register whereby the information pulses written in in the storage elements are sorted under the control of the sorting pulses derived from the AND-gate 65, the decision device 32 being activated in conformity with the embodiment of FIG. 4 after termination of the sorting process.

In the same manner as explained with reference to FIG. 4, the test process is carried into effect in the device of FIG. 5, namely after writing in in the series arrangement of storage elements a pulse group consisting of five pulses the stored pulses are sorted and at the end of the sorting process the output circuit 32 indicates by means of a 1 or 0 pulse whether the stored pulse pattern satisfies or does not satisfy the imposed test criterion. The same advantages as in the device of FIG. 4 are obtained with the device of FIG. 5, but as compared with FIG. 4 an economy in the number of storage elements is obtained, for the same cascade circuits of storage elements is used as a shift register and as a sorting register due to the described changeover realized by the selection gates.

Figure 6:
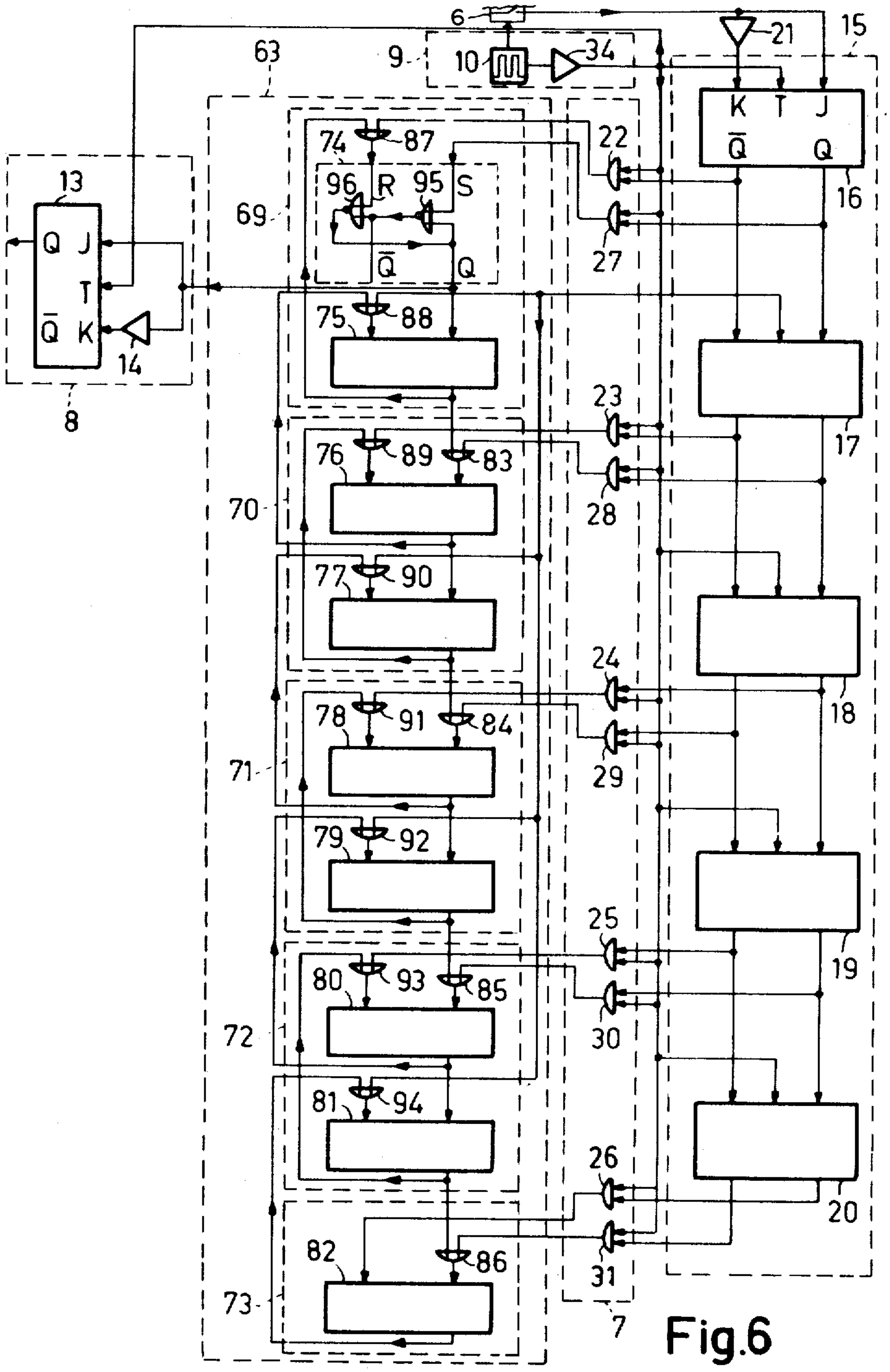
FIG. 6 shows a further embodiment of a device according to the invention.

FIG. 6 shows a further embodiment of a device according to the invention which likewise as the device of FIG. 3, is used as a matched filter. Elements corresponding to those in FIG. 3 have the same reference numerals.

In essence, the device shown in FIG. 6 differs from the previous embodiment in that the sorting process in the sorting register 63 is not carried into effect stepwise under the control of a number of sorting pulses, but is only initiated by one single control pulse after the occurrence of which the sorting process proceeds autonomously.

In this embodiment the sorting register 63 is built up to this end from the storage elements 69–73, while the storage elements 69–72 are constituted by a series arrangement of two bistable multivibrators 74,75; 76,77; 78,79; 80,81 each of the RS type, while the storage element 73 is constituted by only one multivibrator 82, likewise of the RS-type. Each multivibrator is provided with information inputs R and S and information outputs Q and $\bar{Q}$ which are inverse relative to each other, in which every time two successive multivibrators jointly constituting a storage element have the output Q of the first multivibrator connected to the input S of the subsequent multivibrator. In this case the state of each storage element 69–73 is given by the logical value of the output Q of the multivibrators 74,76,78,80,82.

To realize the sorting register with the aid of the multivibrators described, the outputs Q of the multivibrators 75,77,79,81 are connected to the inputs S of the multivibrators 76,78,80,82 through OR-gates 83–86, respectively, while the outputs Q of the multivibrators 75–82 are connected to the inputs R of the multivibrators 74–81 by means of return lines and through OR-gates 87–94, respectively. The output terminals of the write circuit 7 whose input terminals are connected to the shift register elements of the shift register 15 are connected to the OR-gates 83–94, the input S of the multivibrator 74 and the input R of the multivibrator 82, which write circuit likewise as in the embodiment of FIG. 3 is constituted by AND-gates 22–31, an input of these AND-gates being connected to outputs Q or $\bar{Q}$ of the storage elements 16–20 of the shift register 15 and an input being connected to the pulse generator 10 through the inverter 34.

In the embodiment shown the second multivibrator 75,77,79,81 of each storage element 69–72 form blocking elements for the preceding multivibrators 74,76,78,80 of each of these storage elements, which blocking elements are controlled through the OR-gates 88,90,92,94 by the output pulses from the inverter 34 connected to the pulse generator 10. More in detail the structure of the multivibrators of the RS-type used in the sorting register 68 is represented by the multivibrator 74. Particularly this multivibrator is built up from a cascasde circuit of two NOR-gates 95–96 having a feedback cicuit between the output of the gate 96 and the input of the gate 95 in which the inputs S (set) and R (reset) are constituted by a second input of the gates 95 and 96, respectively, and the outputs Q and $\bar{Q}$ are constituted by the output of the gates 96 and 95, respectively. When in such an RS multivibrator a 1 pulse occurs at the input S only, the multivibrator will be in the 1 state which state only changes to the 0 state when a 1 pulse occurs at its input R.

When the pulses stored in the shift register elements 16–20 are written in in the multivibrators 74, 76,78,80,82 through the write circuit 7, a 1 pulse originating from the inverter 34 is applied to the blocking elements 75,77,79,81 through the OR-gates 88,90,92,94, to prevent a shifting of the pulses stored in each of the multivibrators 74,76,78,80. When 0 pulse occurs at the output of the inverter 34, the blocking of the blocking elements 75,77,79,81 are unblocked to effect the sorting of the pulses of the stored pulse group as a result of the return lines, in the manner as described hereinbefore. The duration of the sorting process is mainly determined by the time constants of the composite RS multivibrators of the sorting register.

The result of the test process of the matched filter described is indicated at the end of the sorting period in the manner as described with reference to FIG. 3 by the decision device 8 corresponding to the device of FIG. 1, which device is connected to the output Q of the multivibrator 74. When, for example, a 1 pulse occurs at the output of this decision device, the characteristic pulse group of the matched filter is stored in the shift register while the registered pulse pattern a 0 pulse at the output of decision device indicates that the pulse group stored in the shift register differs from the characteristic pulse group.

As compared with the previous embodiments this device has the considerable advantage that control pulses of high pulse frequency need not be used and that the duration of the sorting process is reduced to a considerable extent because the sorting process in this embodiment is mainly determined by the time constant of the composite RS multivibrators of the sorting register.

What is claimed is:

1. A digital device for separating the logical 1 and 0 bits of a logical word from an information source and for indicating the number ($x$) of logical 1 bits in said word the device comprising n series arranged storage register stages where $n$ is at least equal to two, each stage comprising a bistable switch triggerable to a first stable state in response to the concurrence of a clock pulse and a logical 1 signal on a first input thereof and triggerable to a second stable state in response to the concurrence of a clock pulse and a logical 1 signal on a second input thereof, each switch providing a logical 1 signal on a first output thereof in response to the first state of the switch and providing a logical 1 signal on a second output thereof in response to the second stable state of the switch; generator means providing clock pulses to each stage, means connecting the first output of each of the first $n-1$ stages to the first input of the next succeeding adjacent stage, feedback means connecting the second output of the last $n-1$ stages to the second input of the adjacent preceeding stage; storage means for setting the stages to states corresponding to bits of a digital word containing ($x$) logical 1's, the device thereby separating the logical 1 signals stored in the stages and shifting said logical 1 signals to the last ($x$) stages in response to the clock pulses; and indicating means connected to an output of a stage corresponding to the number ($x$) for providing a signal in response to a binary 1 stored in the binary switch that is ($x$) stages from the last stage after completion of the separation and shifting.

2. A device as claimed in claim 1 further comprising means for providing blocking voltages to an information input of the first storage element and to an information input of the last storage element of the sorting register, to prevent stored pulses from being shifted out of the register during the sorting period.

3. A device as claimed in claim 1, characterized in that the indicating means comprises a bistable trigger circuit producing an output pulse each time in response to a signals from the indicating means.

4. A device as claimed in claim 1, characterized in that the indicating means is constituted by a selection gate.

5. A device as claimed in claim 1, characterized in that said storage means comprises an input circuit in the form of a series-to-parallel converter series connected to said information source and gating means responsive to clock pulses for connecting the parallel output lines of said converter to the storage elements of the sorting register.

6. A device as claimed in claim 5, characterized in that said series-to-parallel converter is constituted by a shift register comprising a plurality of cascade arranged shift register elements the contents of which is shifted under the control of shift pulses originating from said clock pulse circuit.

7. A device as claimed in claim 1, characterized in that the storage elements are constituted by a cascade arrangement of two bistable multivibrators, the second multivibrator constituting a blocking element to prevent pulses stored in the first bistable multivibrator of each storage element from being shifted during the storing period, and under the control of which blocking elements the stored pulses of the stored pulse group assorted during the sorting operation.

8. A device as claimed in claim 15 further comprising comutating means connected to the generator for providing sequential enabling signals to the storage means, the clock pulse inputs of the stages and to the indicating means at intervals timed to effect the storage of the word from the information source prior to the application of clock pulses to the stages and to activate the indicating means after the separation and shifting operations.

9. A device as claimed in claim 8, characterized in that the generator means comprises a clock pulse oscillator, and a frequency multiplier an input of which is connected to an output of the clock pulse oscillator incorporated in said commutating means and controlling the information pulse source.

10. A device as claimed in claim 8 characterized in that said commutating means comprises first gating means connecting an information output of a shift register element to an information input of the subsequent shift register element, and second gating means connecting an information output of each pair of two successive shift register elements to an information input of said pair; mean applying control pulses to said gating means for operating said first gating means during the storing cycle and said second gating means during the cycle of sorting operation.

11. A device as claimed in claim 10 characterized in that the gating means of said write circuit are arranged so as to selectively connect the parallel outputs of said series-to-parallel convertor to the storage elements of said sorting register to form a matched filter which in response to the occurrence of a predetermined information pulse sequence originating from said information pulse source effect the storing of a predetermined pulse group in said storage register.

12. A device as claimed in claim 10 characterized in that the gating means of said write circuit are arranged so as to connect corresponding parallel outputs of said series-to-parallel convertor to corresponding parallel inputs of the storage elements of said sorting register to form a pulse group analyser for analysing pulse groups of $n$ binary pulses having $m$ pulses of binary value 0, the indicating means of said output circuit being connected to the outputs of the storage elements of the sorting register representing the $m^{th}$ and $m+1$st binary pulse.

* * * * *

PO-1050
(5/69)

UNITED STATES PATENT OFFICE
CERTIFICATE OF CORRECTION

Patent No. 3,764,991 Dated October 9, 1973

Inventor(s) WILLIAM E. METZENTHEN AND NICOLAAS A.M. VERHOECKX

It is certified that error appears in the above-identified patent and that said Letters Patent are hereby corrected as shown below:

Col. 4, line 1, before "pulse" insert --1--;

Col. 6, line 29, "filer" should be --filter--;

"control filter;" should be --control device-- line 47, " ." " should be --" .--;

line 67, "pulse" should be --pulses--;

IN THE CLAIMS

Claim 7, line 8, cancel "as-" and insert --are--;

Claim 8, line 1, "claim 15" should be --claim 1--.

Signed and sealed this 2nd day of April 1974.

(SEAL)
Attest:

EDWARD M.FLETCHER,JR.
Attesting Officer

C. MARSHALL DANN
Commissioner of Pate